Dec. 10, 1968     P. PINK ETAL     3,415,373

PARTICLE SIZE CLASSIFICATION METHOD AND APPARATUS

Filed Aug. 27, 1965     7 Sheets-Sheet 1

INVENTORS.
PETER PINK
WOLFGANG SCHLITTER

Kurt Kelman
Agent

Dec. 10, 1968    P. PINK ETAL    3,415,373
PARTICLE SIZE CLASSIFICATION METHOD AND APPARATUS
Filed Aug. 27, 1965    7 Sheets-Sheet 3

INVENTORS
PETER PINK
WOLFGANG SCHLITTER
BY
Kurt Kelman
Agent

INVENTORS.
PETER PINK
WOLFGANG SCHLITTER
BY
Kurt Kelman
Agent

Dec. 10, 1968  P. PINK ET AL  3,415,373
PARTICLE SIZE CLASSIFICATION METHOD AND APPARATUS
Filed Aug. 27, 1965  7 Sheets-Sheet 5

INVENTORS.
PETER PINK
BY WOLFGANG SCHLITTER

Kurt Kelman
Agent

Dec. 10, 1968   P. PINK ETAL   3,415,373
PARTICLE SIZE CLASSIFICATION METHOD AND APPARATUS
Filed Aug. 27, 1965   7 Sheets-Sheet 6

INVENTORS.
PETER PINK
WOLFGANG SCHLITTER

Kurt Kelman
Agent

Fig. 19

United States Patent Office 3,415,373
Patented Dec. 10, 1968

3,415,373
PARTICLE SIZE CLASSIFICATION METHOD
AND APPARATUS
Peter Pink, 78 Klein-Rotz, near Korneuburg, Austria, and
Wolfgang Schütter, Auhofstrasse 240, Vienna XIII,
Austria
Filed Aug. 27, 1965, Ser. No. 483,245
Claims priority, application Austria, Aug. 31, 1964,
A 7,503/64
20 Claims. (Cl. 209—137)

ABSTRACT OF THE DISCLOSURE

In classification apparatus wherein particulate material is separated by gravity into coarse and fine fractions, the coarse fraction sinking through an upwardly moving fluid stream and the fine fraction being carried upwards with the stream, portions of the fluid carrying the particles are diverted from the straight main stream into laterally adjacent pockets wherein they are formed into a vortex having a transverse axis, the coarser particles being centrifugally thrown outwardly in the vortex whence they are returned to a lower portion of the main stream.

This invention relates to a method of classifying a mixture of particles according to their size by means of a fluid, the particles differing in their settling velocity in the fluid, and to apparatus for performing the method.

The invention is more particularly concerned with a multistage classification process in which a coarser fraction and a finer fraction are separated from each other in each of several areas of a classification zone, the coarser and finer fractions travel through the classification zone from one area to the other in opposite directions, and classified fine and coarse fractions are ultimately withdrawn from spaced areas of the zone.

It is well known that the amount of coarse material in the withdrawn fine fraction, and the amount of fine material in the withdrawn coarse fraction can be reduced by increasing the number of stages. The amount of necessary classification fluid increases with the number of stages, and the energy required for circulating the fluid through the classification zone increases correspondingly. It has been found heretofore that the amount of classification fluid can be reduced by diverting portions of the main stream and subjecting the diverted portions to mechanical treatments which accelerate separation. The overall consumption of energy is not materially affected by such modification of the basic multistage process because of the energy requirements of the mechanical treatments.

An object of the invention is the provision of a classification method and apparatus which provide the results of a multistage process with a minimal amount of classification liquid and without use of external mechanical treatments, thereby reducing energy consumption.

A more specific object of the invention is the provision of compact classification apparatus which is free from moving mechanical parts in contact with the particle mixture to be classified.

With these and other objects in view, the invention in one of its aspects resides in a method of classifying a mixture of particles by means of a flowing fluid, the particles having different settling velocities in the fluid, which method comprises causing the fluid having the particles dispersed therein to flow as a main stream between two portions of a classification zone in an upwardly directed path at a velocity intermediate the highest and lowest settling velocities of the particles. A portion of the main stream is diverted into an arcuate path in which the diverted material forms a vortex about an axis transverse to the main flow path. The particles of highest settling velocity tend to collect in a portion of the vortex remote from the axis, and those of lowest settling velocity near the axis. The collected particles are returned to two parts of the main stream spaced in the direction of flow of the main stream.

The vortex formation may be enhanced, and the vortex may be stabilized, by injecting a stream of the classification fluid tangentially into the vortex. The vortex may be either cylindrical about a straight axis or tore-shaped about an axis which is arcuate.

Two vortexes may be formed by two diverted main stream portions, and such vortexes are preferably spaced from the main flow path and from the main stream flowing therein in opposite transverse directions. The two vortexes are preferably offset in the direction of flow of the main stream by a distance which is approximately one-half of the spacing of the afore-mentioned parts of the main stream.

The apparatus employed for carrying out the method includes walls which define an upwardly extending main flow path. Means are provided for feeding the classification fluid to a bottom portion of the path and for withdrawing the fluid from the top portion of the path. A feeding device feeds the particulate raw material to a portion of the path intermediate the bottom and top portions. Baffles positioned for diverting a portion of the main stream define a pocket which communicates with the intermediate portion of the path and generates a vortex of the fluid about an axis transverse of the main flow path.

Other features and many of the attendant advantages of this invention will be readily appreciated as the same is understood by reference to the following detailed description of preferred embodiments when considered with the annexed drawing in which.

Figure 1:
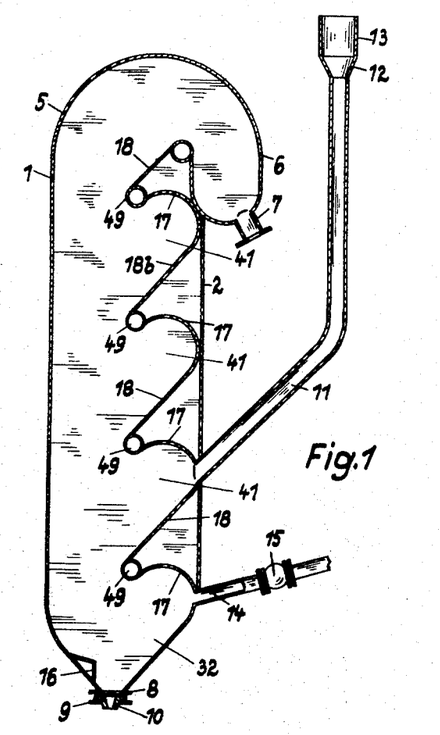
FIG. 1 shows a hydraulic classifier of the invention in side-elevational section on the line I—I in FIG. 2.
Figure 2:
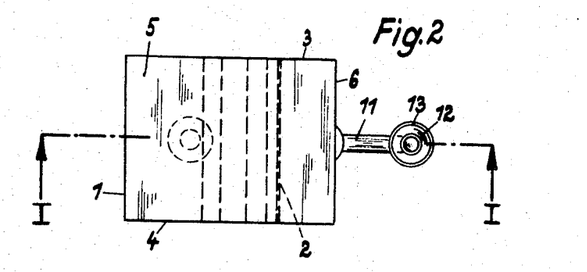
FIG. 2 illustrates the classifier of FIG. 1 in top plan view.

Referring now to the drawing in detail, and initially to FIGS. 1 and 2, there is seen a hydraulic classifier whose main portion is a vertically elongated shell of rectangular cross section formed by a front wall 1, a rear wall 2 and side walls 3, 4. The top of the classifier is formed by a generally semicylindrical cover 5 which leads from the main portion to a rearwardly offset overflow trough 6 of the classifier outside the rear wall 2. A flanged tubulure 7 on the trough 6 provides a connection with further processing equipment, not itself shown.

The downwardly tapering bottom portion 32 of the classifier is provided with a discharge nozzle 10 which is attached by a fixed flange 8 and a loose flange 9.

A feed pipe 11 for a particulate material to be classified enters the classifier at a level intermediate the bottom portion 32 and the overflow trough 6. It is connected by a funnel 12 to a storage bin 13. The liquid classification medium is supplied to the main portion of the classifier adjacent the bottom portion 32 by a supply pipe 14 equipped with a control valve 15. A deflector 16 is arranged on the bottom portion 32 opposite the orifice of the supply pipe 14 to deflect the entering liquid in an upward direction.

Support pipes 49 are each fastened to the side walls 3, 4 and are vertically spaced in a row which extends substantially over the height of the main classifier portion. Baffle plates 17 and 18 extend between the side walls 3, 4 and the several pipes 49, and are fastened to the rear wall 2 in such a manner as to form three pockets 41 which are open towards the vertical main flow path through the classifier along the front wall 1. The baffle plates 18 in the several pockets provide obliquely inclined bottom walls or chutes which lead from the pocket into the main flow path. The baffle plates 17 form arcuately curved top walls in the several pockets 41, the axes of curvature of the top walls being perpendicular to the main flow path. A baffle plate 18 provides a similar chute for the top portion of the classifier under the curved cover 5, and a baffle plate 17 provides a curved top wall over a part of the bottom portion and the orifice of the supply pipe 14. The feed pipe 11 enters the classifier in the lowermost pocket 41.

The classifier shown in FIGS. 1 and 2 is operated in a manner not substantially different from the operation of conventional equipment of the same type. A mixture of particles differing in settling velocity in the classification medium is fed from the bin 13 in continuous stream into the lowermost pocket 41. This stream may be controlled by conventional means (not illustrated) but it is not necessary to control both the material to be classified and the classification medium which is admitted to the classifier through the adjustable valve 15. Coarse particles are withdrawn from the nozzle 10 with only minor amounts of the classification medium, whereas most of the medium is withdrawn from the classifier through the discharge tubulure 7, together with the fine particle fraction.

The size separation between the two discharged fractions is very sharp because of the presence of the baffle plates 17, 18 and associated structure. The movement of the main stream of liquid medium and of suspended particles in the main flow path of the classifier is generally upwards but the portions of this stream which are diverted into the several pockets 41 by the baffle plates 17 travel in generally circular paths to form a generally cylindrical vortex or eddy in each pocket 41.

The flow pattern having somewhat similar features is induced in and near the bottom portion 32 by the arcuate configuration of the associated baffle plate 17, and by the direction of the orifice of the supply pipe 14 which has a major tangential component with respect to the arc of the associated plate 17. Eddy flow in one of the pockets 41 is enhanced by discharge of particulate raw material from the feed pipe 11 in a direction approximately tangential to the vortex in the pocket.

As the main stream of liquid classification medium and of suspended particles moves upward in the main flow path of the classifier, those particles whose settling velocity is greater than the overall velocity of the main stream tend to move towards the bottom portion 32 whereas the particles of lower settling velocity tend to move towards the overflow portion 6. The effective length of the average flow path is substantially longer than the height of the classifier as portions of the liquid and solid material are diverted into the pockets 41.

At adequate flow rates in the main flow path, the centrifugal forces generated by eddy flow in the pockets materially contribute to separation of the solid particles according to size and/or specific gravity. The coarser particles generally move radially outwardly in each vortex and ultimately are directed into the main stream in a downward direction by the baffle plates 18. The lighter or finer particles are returned to the main flow path from each vortex at a higher level than the coarse particles, whereby the separating efficiency of the classifier is substantially increased over that of the main flow path.

Figure 3:
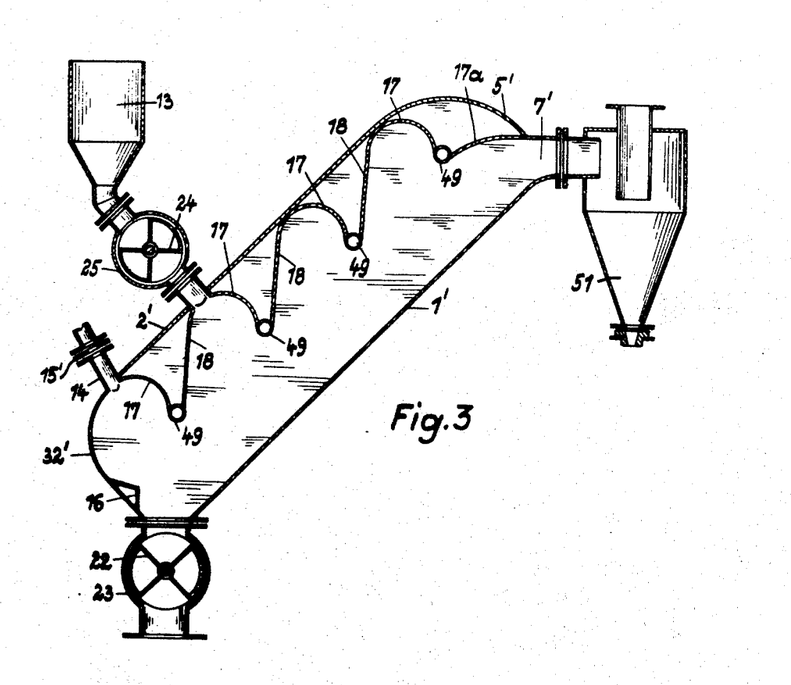
FIGS. 3 and 4 are views of a pneumatic classifier of the invention corresponding to those of FIGS. 1 and 2 respectively.
Figure 4:
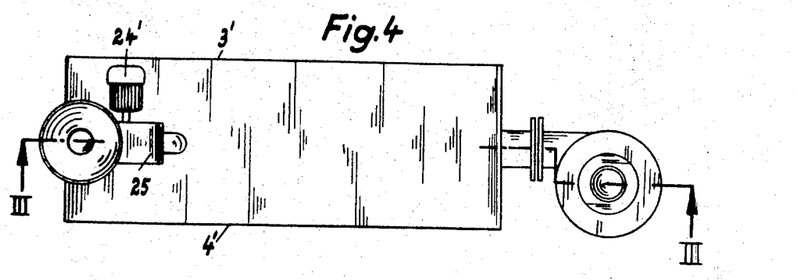

FIGS. 3 and 4 show a modified classifier of the invention equipped for use with a gaseous classification medium but operating on the same principle as the apparatus illustrated in FIGS. 1 and 2.

The front wall 1' and rear wall 2' of the classifier shell are obliquely inclined relative to a horizontal plane, and are connected by side walls 3', 4'. The classifier cavity is closed by rounded top and bottom walls 5', 32'. Several arcuate baffle plates 17 and flat baffle plates 18 are mounted between the side walls 3', 4' and the several supporting pipes 49 to form pockets near the rear wall 2' to which the several baffle plates are also fastened. The pockets are open towards the main flow path through the classifier in a generally downward direction, and the inner face of the front wall 1' provides an obliquely inclined chute for coarse particles towards a discharge conduit 23 in which a rotary vane feeder 22 is arranged to permit discharge of the coarse fraction but to prevent escape of the gaseous classification medium.

A similar rotary vane feeder 24 driven by an electric motor 24' is arranged in a feed conduit 25 which leads from a storage bin 13 into a pocket just above the bottom of the classifier, classifying gas being discharged into that bottom through a supply pipe 14 in which the flow rate is controlled by an orifice plate 15'. A deflector 16 on the bottom wall 32' directs the stream of entering gas away from the discharge conduit 23. A curved baffle plate 17a and discharge duct 7' lead from the top of the classifier into the feed duct 7' of a cyclone 51 in which the classification medium is separated from the fine particles in the usual manner.

The mode of operation of the pneumatic classifier shown in FIGS. 3 and 4 is so closely similar to that of the hydraulic classifier illustrated in FIGS. 1 and 2 that a more detailed description is unnecessary.

Figure 5:
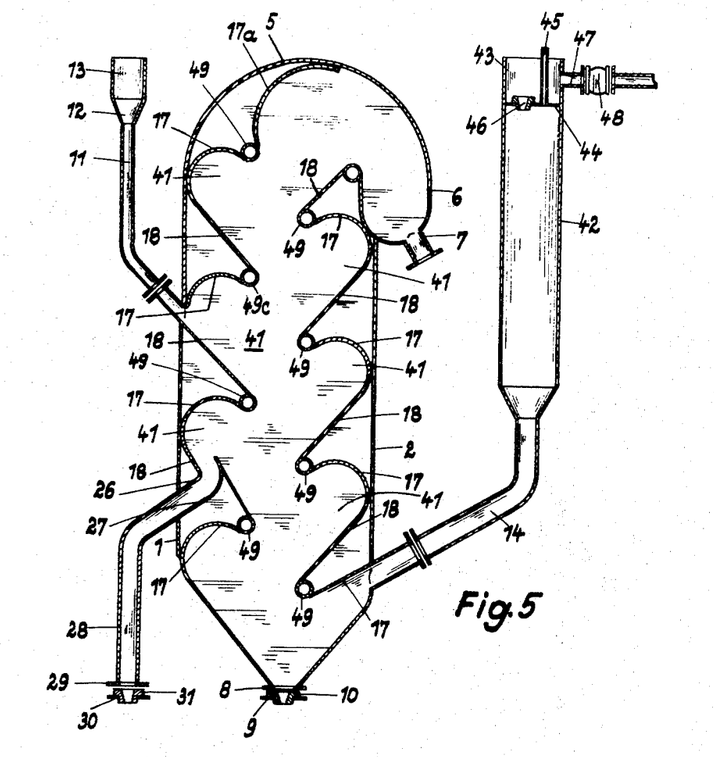
FIGS. 5 and 6 show another hydraulic classifier in the manner of FIGS. 1 and 2.
Figure 6:
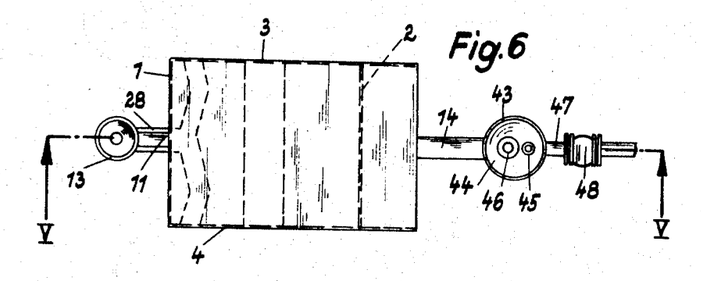

The hydraulic classifier illustrated in FIGS. 5 and 6 has a shell substantially identical with that shown in FIGS. 1 and 2 and equipped with baffle plates 7, 8 attached to the rear wall 2 which define three pockets 41. Three additional pockets 41 are formed on the front wall 1 by baffle plates 17, 18 in a corresponding manner. The baffle plates on the walls 1, 2 are offset in the direction of the main flow path by approximately one half of the height of one pocket so that the fines are discharged from each pocket towards the baffle plate 18 at the bottom of the next higher pocket on the opposite wall, and mixed there with the coarse material about to be returned to the main stream which is limited to the central portion of the classifier shell. The coarse material from each pocket is discharged towards the bottom baffle plate 18 of the next lower pocket on the opposite wall.

The liquid classification medium is fed to the bottom of the classifier shell through a supply pipe 14 which is connected to a standpipe 42 and enters the classifier shell through the rear wall 2. A horizontal partition 44 separates the open top 43 from the remainder of the standpipe 42. A vent pipe 45 communicates with an opening in the partition 44 and terminates above the top of the standpipe for release of air from the liquid normally held in the pipe. A metering nozzle 46 is arranged in the partition 44 to connect the two portions of the standpipe. The classification medium is supplied to the top 43 of the standpipe through a supply pipe 47 equipped with a shut-off valve 48.

The particulate raw material is fed to the middle pocket 41 on the front wall 1 through a feed pipe 11 from a storage bin 13 and a funnel 12 as described before. Plates 26, 27 define a slot whose orifice in the lowermost pocket 41 on the wall 1 has a length extending from the wall 3 to the wall 4, and which tapers towards an outlet pipe 28 equipped with a nozzle 31 which is held in place by fixed and loose flanges 29, 30. The orifice of the slot faces approximately tangentially into the direction of eddy flow within the associated pocket 41, the direction of flow being counterclockwise in the pockets mounted on the front wall 1, and clockwise in those attached to the rear wall 2, as viewed in FIG. 5.

The degree of separation of the particles into the several fractions is a direct function of the number of pockets in the classifiers of the invention under otherwise comparable conditions. The greater number of pockets in the classifier of FIG. 5 as compared to that shown in FIG. 1 permits a particle fraction of intermediate size to be withdrawn from the classifier through the pipe 28. The operation of the last-described device is otherwise closely analogous to that described hereinabove with reference to FIGS. 1 and 2.

Figure 7:
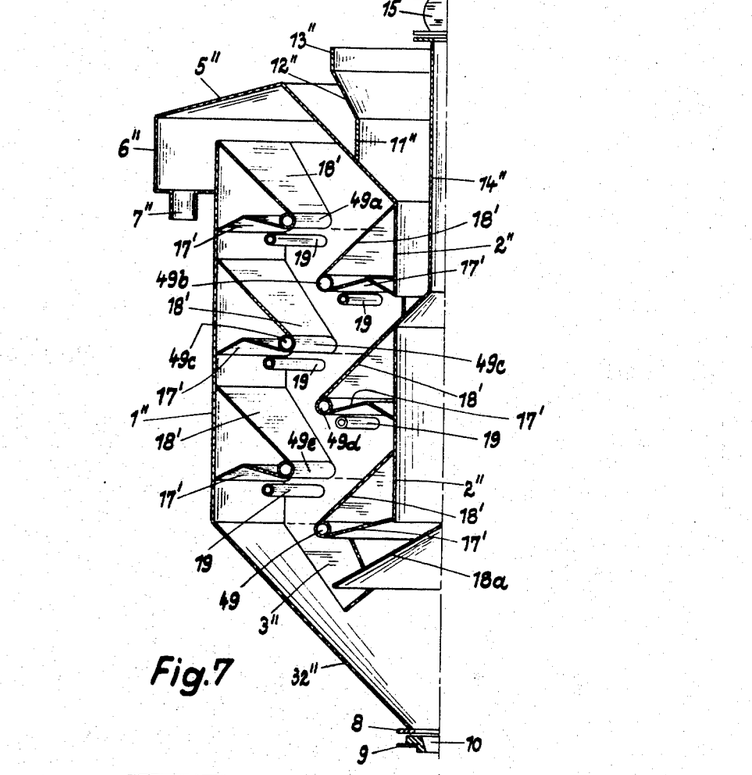
FIG. 7 shows a generally radially symmetrical hydraulic classifier of the invention in axial elevational section, only one half of the apparatus being represented.
Figure 8:
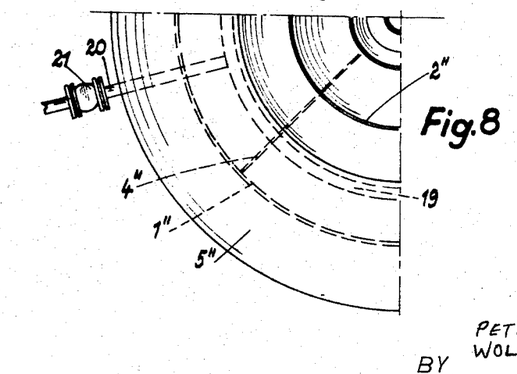
FIG. 8 is a partial plan view of the apparatus of FIG. 7.

The classifier shown in FIGS. 7 and 8 has cylindrical outer and inner walls 1", 2" which define therebetween an annular space divided into four compartments by radially directed partitions 3", 4" of which only two are seen in the drawing. The compartments communicate with each other at the top where they are covered by a common annular hood 5", and at the bottom where they communicate with a conical container 32" attached to the outer wall 1" and downwardly tapering to a flangedly discharged nozzle 10. Liquid classification medium enters the bottom container 32 through an axial conduit 14" equipped with a control valve 15, and the medium leaves the classifier by overflow over the top edge of the outer wall 1" into an annular trough 6" from which it is withdrawn to a centrifugal separator or the like through a tubulure 7" for separation from the fine fraction of suspended solid particles.

Baffle plates 17', 18' similar in shape and function to the aforedescribed plates 17, 18 form five pockets on the walls 1", 2" of each compartment substantially in the manner described above with reference to FIGS. 5 and 6. The pockets on the inner wall 2" are offset by approximately one half of the height of a pocket from the pockets on the outer wall 1".

A conical distributor baffle plate 18a directs the stream of classification medium from the supply conduit 14" to a portion of the bottom container 32" subjacent the four compartments and spaced from the nozzle 10. Formation of an approximately cylindrical vortex in each of the several pockets is enhanced by liquid discharged into the pockets from annular distributor pipes 19 connected to a source of liquid classification medium by a pipe 20 equipped with a control valve 21, as seen in FIG. 8. The several pipes 19 have rows of perforations (not seen in FIGS. 7 and 8) and directed approximately tangentially to the vortex stream in the corresponding pocket.

The particulate solid material which is to be classified in the apparatus shown in FIGS. 7 and 8 enters the several compartments from an upwardly open cylindrical bin 13" in which the conduit 14" is coaxially arranged. The bin 13" communicates with the four compartments of the classifier through a funnel 12", a feed pipe 11", and apertures in the inner wall 2" on a level approximately equally spaced from the hood 5" and the bottom container 32".

Enhancement of vortex flow in the several pockets of the classifiers seen in FIGS. 1 to 6 may be achieved by modified details illustrated in FIGS. 9 to 18, and these details are equally applicable to any one of the three embodiments of the invention having shells of polygonal cross section. They are applicable to the apparatus shown in FIGS. 7 and 8 with minor changes which will readily suggest themselves to those skilled in the art.

Figure 9:
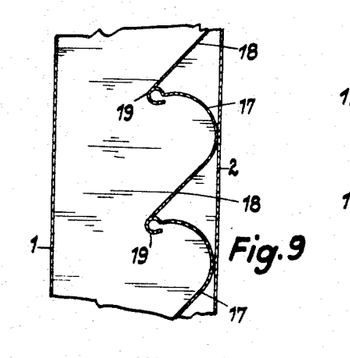
FIG. 9 shows a modified detail applicable to the classifiers of FIGS. 1, 3 and 5 in side-elevational section.
Figure 10:
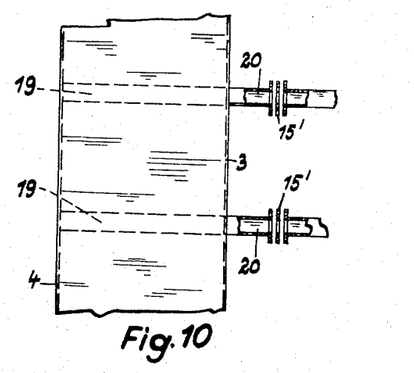
FIG. 10 is a front elevational view of the detail of FIG. 9.

In the device illustrated in FIGS. 9 and 10, baffle plates 17, 18 are laterally fastened to side walls 3, 4 and to a rear wall 2, and have edges adjacent the main flow path of the classifier, which are supported on apertured pipes 19, 19. The pipes are connected to a source of classifying fluid through supply pipes 20 equipped with orifice plates 15', and their apertures are tangentially directed against the concave curved face of associated baffle plates 17 to initate or enhance clockwise vortex flow, as viewed in FIG. 9, in the pocket partly formed by the baffle plate 17.

Figure 11:
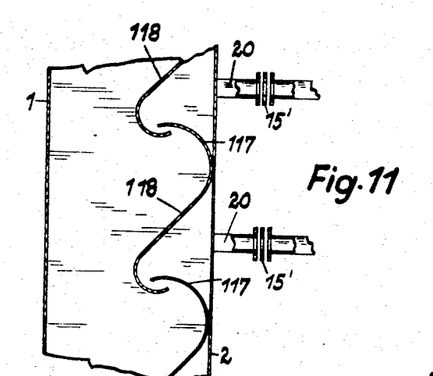
FIG. 11 illustrates a modification of the detail of FIG. 9.

In the apparatus illustrated in FIG. 11, the otherwise dead spaces enclosed by the baffle plates and the walls of the classifier shell are connected to a source of classification medium by supply pipes 20 equipped with orifice plates 15,' as described above. The baffle plates 117, 118 define pockets, as described above, and have edge portions which spacedly overlap each other so as to define a slot directed tangentially clockwise into the pockets.

Figures 12, 13:
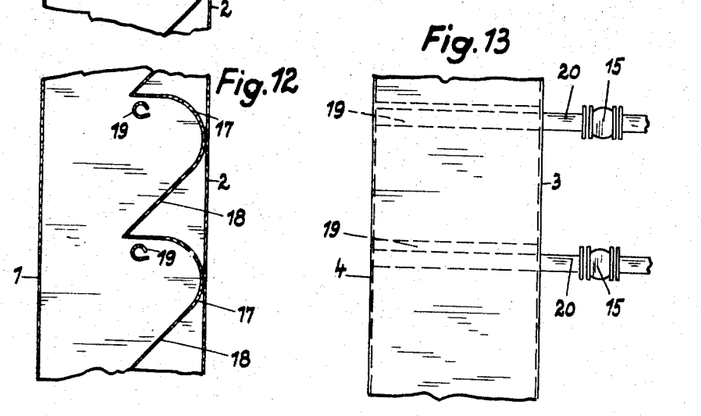
FIGS. 12 and 13 show yet another modification in views corresponding to those of FIGS. 9 and 10.

The apparatus illustrated in FIGS. 12, 13 shows a detail of FIGS. 7, 8 as applied to the classifiers having rectangular shells. Apertured pipes 19 are arranged in the pockets of the classifier in the manner discussed above with reference to FIGS. 7 and 8, and are supplied with fluid through pipes 20 and control valves 15.

Figures 14, 15:
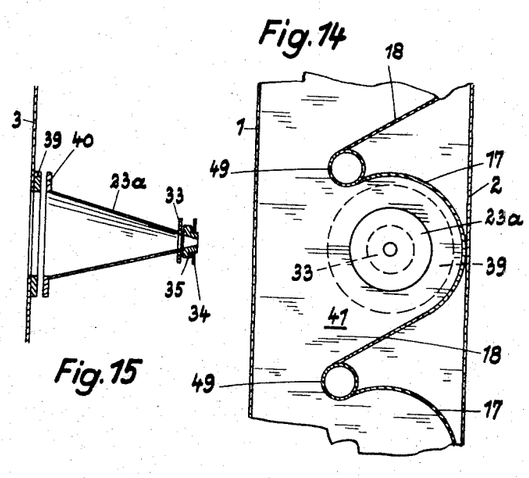
FIG. 14 illustrates a further modified detail applicable to the classifiers of FIGS. 1, 3 and 5, in side elevation.
FIG. 15 shows the device of FIG. 14 in fragmentary sectional front elevation.

Vortex formation may further be enhanced by withdrawing the finest fraction of the solid particles that reach the vortex from the core of a vortex. A suitable arrangement is shown in FIGS. 14, 15 which illustrates a modification of the classifier of FIG. 1, but this arrangement is equally applicable to the other classifiers described.

A side wall 3 of the classifier has a circular opening in a pocket 41 approximately coaxial with the axis of the vortex contained in the pocket during operation of the classifier. The outer face of the wall 3 is reinforced with an annular flange 39 to which the flange 40 on a hollow conical cyclone tube 23a is attached by nonillustrated screws in the usual manner, a gasket (not shown) providing a tight seal. The circular motion of the vortex in the pocket 41 extends into the cyclone tube 23a and causes the solid particles collected near the axis of the pocket 41 to move axially toward a nozzle 35 attached to the apex of the tube 23a by flanges 33, 34.

Figure 16:
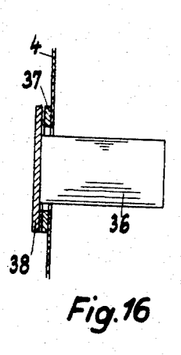
FIG. 16 shows an additional modified detail which may be combined with that of FIGS. 14 and 15, the view being in front elevational section.

The effectiveness of this cyclone arrangement, which withdraws an intermediate fraction from the classifier, is enhanced when a coaxial baffle of circular cross section is provided in the pocket 41. As shown in FIG. 16, a cylindrical tube 36 passes through the wall 4 and carries a flange 38 which is attached to a reinforcing ring 37 on the outside of the wall 4. The surface of the tube 36 collects the fine fraction from the vortex in a pocket 41 and guides it axially into an associated cyclone tube, not itself seen in FIG. 16.

Figure 17:
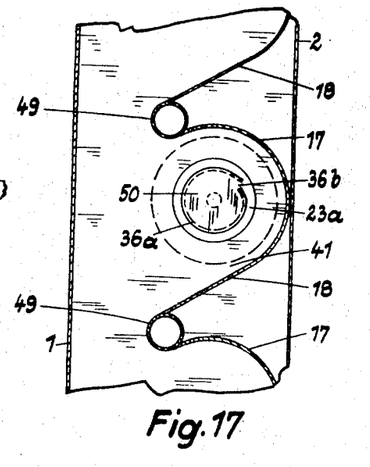
FIGS. 17 and 18 illustrate a further variation of the detail of FIG. 16 in side-elevational and front-elevational section respectively.
Figure 18:
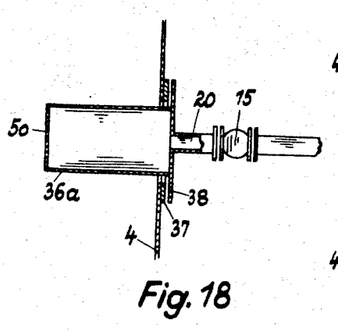

The baffle 36a illustrated in FIGS. 17 and 18 is closed at its inner end by a cover 50 and is connected by a pipe 20 and a control valve 15 to a nonillustrated overhead tank for the classification liquid. A slot 36b in the generally cylindrical baffle wall discharges the liquid approximately tangentially into the pocket 41 in which the baffle 36a is positioned.

Figure 19:
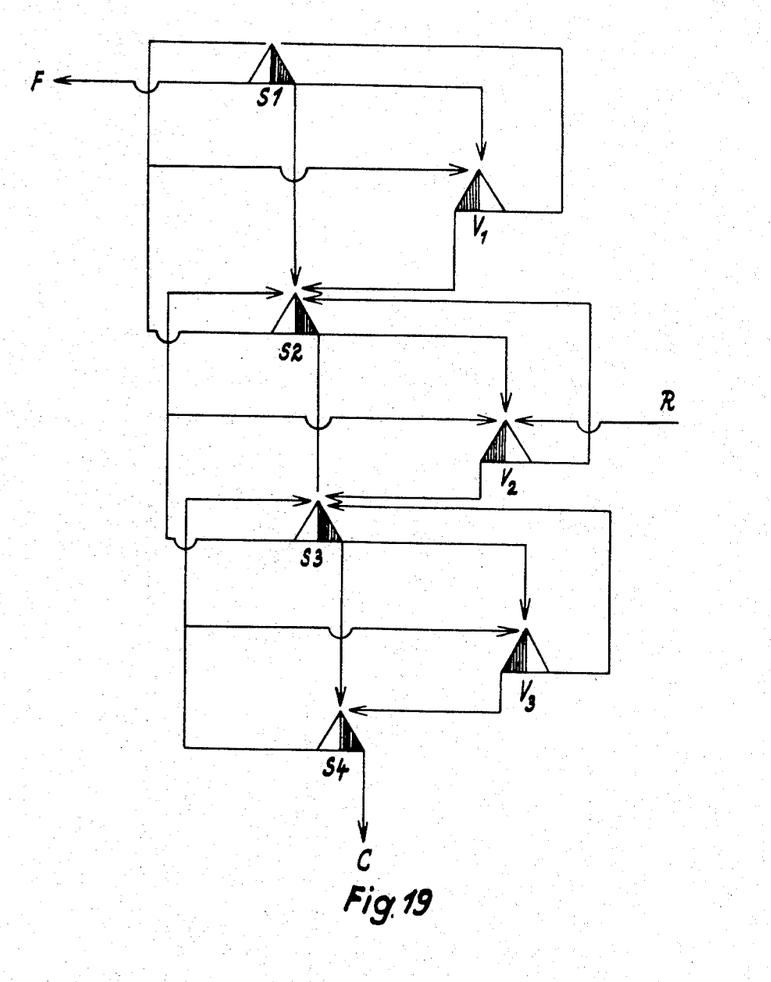
FIG. 19 is a flow diagram which illustrates the operation of the several classifiers of the invention.

FIG. 19 diagrammatically illustrates the flow of material through a classifier of the invention which has three areas of vortex formation indicated by triangles $V_1$, $V_2$, $V_3$. The main flow path of the classifier is indicated by four triangles $S_1$, $S_2$, $S_3$, $S_4$ which represent portions or stages of the main flow path bounded by at least one transverse plane approximately through the axis of a vortex in a pocket 41. The apexes of the triangles S and V represent the input to each stage or vortex, and each triangle is divided into a white area and a dark area respectively representing the flow of finer and coarser particles in the respective stages or vortexes. The flow of the classification medium is not represented in the drawing.

A raw mixture R of particles to be classified is fed to a vortex $V_2$ in which it is subjected to a preliminary classification, the coarser particles, or particles having a higher settling velocity, being discharged into the main stream in the stage $S_3$, and the finer particles entering the main stream in the higher stage $S_2$. The heavier or coarser particles from the latter stage partly drop directly into the lower stage $S_3$, and are partly drawn into the vortex $V_2$. A portion of the finer particles from the stage $S_3$ rises directly to the superjacent stage $S_2$ but another substantial part is diverted into the vortex $V_2$.

Analogous flow takes place between the vortex $V_1$ and the stages $S_1$ and $S_2$ of the main stream, and also between the vortex $V_3$ and the stages $S_3$ and $S_4$. The coarse material substantially free from fines which is discharged from the stage $S_4$ leaves the classifier in a stream C, and the fines F are discharged from the classifier at the topmost stage $S_1$.

The classifiers of the invention thus internally recycle intermediate, partly classified fractions by means of centrifugal forces which are generated solely by the flow of the gaseous or liquid classification medium. The particles do not leave the classifier shell until they are fully separated, and no external sources of energy other than those needed for maintaining the flow of classifying medium are employed. Gravity and the aforementioned centrifugal forces are made to cooperate for producing the desired result. The most effective separation is obtained if the centrifugal forces acting on the particles in the several pockets t41 and correspondingly shaped other portions of the flow path are barely greater than the forces of gravity.

The classifiers of the invention produce coarse and fine (and intermediate) fractions which contain fewer particles outside the desired range of particle sizes when operated at the same rate of flow of classification medium than the best conventional classifiers, and are capable of producing the same degree of separation as these known devices when operated at a substantially lower flow rate of classification fluid. The classifiers of the invention operate equally efficiently over a wide range of flow rates of the classification fluid, and over a wide range of feed rates for the material to be classified. The degree of separation obtained with the devices of the invention is sharply increased over that available in conventional classified height and overall volume.

The classifiers of the invention are free of movable parts and do not require the use of slurry pumps and similar devices for enhancing the flow velocity of mixtures of solids and fluids. There are no critical dimensions, and there is no significant wear in properly built classifiers of the invention. The cost of operating and maintaining the classifiers of the invention is thus extremely low.

It will be appreciated that the advantages of the invention may be achieved with devices which differ somewhat from those illustrated in the drawing and described hereinabove. The cross sectional shape of the flow path through the classifier needs not be that of a quadrangle having straight walls (FIGS. 1 to 6) or partly curved walls (FIGS. 7 and 8) although classifier shells of polygonal or circular cross section have the obvious advantage of easy fabrication from sheet material.

The arcuate baffle plates 17 which form the top walls of pockets and similar vortex areas in the embodiments of the invention shown in FIGS. 1 to 6 may be replaced by the angularly bent plates 17' shown in FIGS. 7 and 8 with a small loss in efficiency due to secondary turbulence, but with a gain in stiffness and ease of fabrication which may outweigh the afore-mentioned minor drawback.

The axes of the vortexes in the pockets 41 and in similar areas of the classifiers of the invention are transverse to the direction of the main flow path, and preferably perpendicular to the latter, but the vortexes need not necessarily be cylindrical and the axes need not be straight. In the classifier shown in FIGS. 7 and 8, the individual vortexes are generally portions of a tore, and their axes are circular arcs.

The art of hydraulic and pneumatic classification is well developed, and the known rules which govern the selection of a classification fluid of a specific gravity and viscosity suitable for a mixture of particles differing in settling velocity are applicable to the devices of the invention in the same manner as to conventional apparatus. The selection of the classification fluid in the apparatus of the invention thus is not critical beyond the requirements of sound engineering practice well known to those skilled in this art.

While the invention has been described with particular reference to specific embodiments, it is to be understood that it is not limited thereto, but is to be construed broadly and restricted solely by the scope of the appended claims.

What is claimed is:

1. In a classifying apparatus, in combination:
 (a) wall means defining an upwardly extending main flow path;
 (b) supply means for feeding a classification fluid to a bottom portion of said flow path;
 (c) discharge means for withdrawing said fluid from a top portion of said flow path, whereby said fluid flows in an upwardly directed mainstream in said path;
 (d) feed means for feeding a particulate raw material to be classified to a portion of said path intermediate said bottom and top portions;
 (e) baffle means for generating a vortex of said fluid about an axis transverse of said path, said baffle means defining a pocket communicating with said intermediate portion of said path and being positioned for diverting a portion of said main stream into said pocket,
  (1) whereby a particulate material fed to said path is classified into a coarse fraction collecting in said bottom portion and a fine portion discharged with said fluid from said top portion; and
 (f) withdrawing means for withdrawing an intermediate fraction of said particulate material from said pocket, said withdrawing means including a tubular cyclone member of arcuate cross section about said axis, said cyclone member extending outward of said pocket in an axial direction.

2. In an apparatus as set forth in claim 20, separating means communicating with said discharge means for separating said fine fraction from said classification fluid.

3. In an apparatus as set forth in claim 20, outlet means communicating with a part of said intermediate portion spaced from said feed means for withdrawing an intermediate fraction of said particulate material from said stream.

4. In an apparatus as set forth in claim 1, a baffle member in said pocket, said baffle member being of substantially circular cross section about said axis.

5. In an apparatus as set forth in claim 1, said baffle means including a top member and a bottom member having respective opposite faces obliquely inclined relative to said main flow path, said members sloping outward of said pocket toward said bottom portion of said flow path.

6. In a classifying apparatus, in combination:
 (a) an upwardly elongated shell having two opposite longitudinal walls;
 (b) baffle means extending from one of said walls toward the other wall and spaced therefrom so as to leave a substantially unobstructed longitudinal main flow path through said shell,
(1) said baffle means including a plurality of pairs of pocket forming elements, the elements of each pair being offset in the direction of elongation of said shell,
(2) a first element of each pair being nearer the upper end of said shell and having a downwardly directed face adjacent said main flow path and obliquely inclined relative to the same,
(3) the second element of said pair nearer the lower end of said shell having a face spacedly directed toward said face of the first element and sloping toward said lower end,
(4) said pair of elements constituting the wall of a substantially closed pocket communicating with said main flow path through an orifice extending between said faces;
(c) supply means for feeding a classification fluid to said path at said lower end;
(d) discharge means for withdrawing said fluid from said path at said upper end; and
(e) feed means for feeding a particulate raw material to a portion of said path intermediate said ends thereof and below the orifice of at least one of said pockets.

7. In an apparatus as set forth in claim 6, said pocket forming elements constituting a first set of pocket forming elements, a second set of pocket forming elements extending from the other one of said longitudinal walls toward said first set, said sets defining said main flow path therebetween, the pocket forming elements of said second set constituting a plurality of pockets having orifices directed obliquely to the direction of elongation of said shell toward said first set and toward said lower end, the orifices of the pockets formed by said first and second sets being staggered longitudinally of said shell.

8. In an apparatus as set forth in claim 6, the wall of said pocket being partly of arcuate cross section about an axis transverse of said main flow path.

9. In an apparatus as set forth in claim 8, said feed means including a feed conduit entering one of said pockets in a direction approximately tangential relative to a circle about said axis.

10. In an apparatus as set forth in claim 8, said supply means including a supply conduit having an orifice in one of said pockets, said orifice being directed substantially tangentially relative to a circle about said axis.

11. A method of classifying a mixture of particles by means of a flowing fluid, the particles of said mixture differing in their settling velocity in said fluid, which method comprises:
(a) dispersing said patricles in said fluid;
(b) causing said fluid having the patricles dispersed therein to flow as a main stream from one portion toward another portion of a classification zone in an upwardly directed main flow path at a velocity intermediate the highest and the lowest settling velocities of said particles in said fluid;
(c) diverting a portion of said main stream into an arcuate path so as to form a vortex having an axis transverse to said main flow path, whereby said particles of highest settling velocity in the diverted stream portion tend to collect in a portion of said vortex remote from said axis while said particles of lowest settling velocity tend to collect adjacent said axis;
(e) returning said collected particles of lowest setting velocity from said vortex to one part of said main stream;
(e) returning said collected particles of lowest settnig velocity from said vortex to another part of said main stream spaced from said one part in the direction of flow of said main stream; and
(f) diverting another portion of said main stream into another arcuate path to form a second vortex having an axis transverse to said main flow path, said vortexes being spaced from said main flow path and from the main stream flowing therein in opposite transverse directions.

12. A method as set forth in claim 11,, which further comprises tangentially supplying a stream of said fluid to said vortex.

13. A method as set forth in claim 11, wherein said vortex is substantially cylindrical.

14. A method as set forth in claim 11, wherein said vortex is shaped substantially to constitute a section of a tore.

15. A method as set forth in claim 11, said vortexes being offset in the direction of flow of said main stream.

16. A method as set forth in claim 11, said vortexes being offset in the directions of flow of said main stream a distance which is approximately one half of the spacing of said parts of said main stream.

17. A method of classifying a mixture of particles by means of an upwardly flowing fluid, the particles of said mixture differing in their settling velocities in said fluid, which comprises:
(a) dispersing said particles in said fluid;
(b) causing said fluid having the particles dispersed therein to flow in an upwardly moving, straight and unobstructed main stream from one portion toward another portion of a classification zone at a velocity intermediate the highest and the lowest settling velocities of said particles in said fluid;
(c) diverting a portion of said fluid having the particles dispersed therein in each of said classification zone portions from the straight main stream into an arcuate path laterally adjacent the main stream and forming a vortex of said fluid having the particles dispersed therein, the vortex being laterally adjacent the main stream and having an axis transverse to the main stream, the particles of higher settling velocity being centrifugally thrown outwardly away from the vortex axis;
(d) returning the fluid having the particles of higher settling velocity to the straight main stream in the classification zone portion preceding in the direction of the upward flow;
(e) removing the particles of higher settling velocity from the classification zone below said latter classification zone portion; and
(f) removing the particles of lower settling velocity from the classification zone above said latter classification zone portion.

18. The method of claim 17, further comprising the step of causing the main stream to flow at different velocities in successive ones of said classification zone portions.

19. In a classifying apparatus comprising wall means defining a flow path extending upwardly from a bottom to a top portion, feed means for feeding a mixture of particles to be classified to a portion of said path intermediate the bottom and top portions, supply means for feeding a classification fluid to the bottom portion of said flow path at a velocity intermediate the highest and lowest settling velocities of said particles in said fluid, whereby the particles of a settling velocity higher than the velocity of the fluid sink to the bottom portion and the particles of a settling velocity lower than the velocity of the fluid are carried by the fluid to the top portion, and discharge means for withdrawing the fluid with the particles out of the flow path at the top and bottom portions of the flow path, the improvement of a plurality of superposed baffle means extending from the wall means into the flow path above said feed means, each baffle means including an obliquely inclined plate extending in the direction of said path and an arcuate plate extending transversely of said path, said plates being arranged to divert a portion of the fluid containing the particles from a straight main stream moving upwardly along the flow path and into a pocket defined by said plates, the pocket communicating with the straight main stream, and said arcuate baffle means plate being arranged to generate a vortex of said fluid containing the particles about an axis transverse of said path, and laterally adjacent the straight main stream.

20. In the classifying apparatus of claim 19, wherein a line rotating about the axis of the flow path is the generatrix of said wall means, said baffle means being arranged coaxially about said main stream.

References Cited

UNITED STATES PATENTS

| 1,465,884 | 8/1923 | Vandervoort | 209—137 |
| 1,660,685 | 2/1928 | Stebbins | 209—137 X |
| 3,042,204 | 7/1962 | Eder | 209—157 |

FRANK W. LUTTER, *Primary Examiner*.

U.S. Cl. X.R.

209—138, 144, 157, 159, 210, 211